Figure 1:
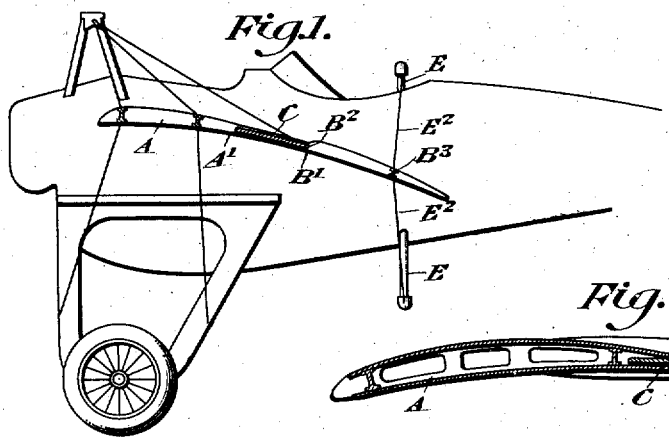

Mar. 6, 1923. Re. 15,555

C. A. WRAGG

AEROPLANE

Original Filed Oct. 21, 1915 3 sheets-sheet 1

Inventor

Charles Arthur Wragg

By Davis & Davis

Attorneys

Mar. 6, 1923. Re. 15,555

C. A. WRAGG

AEROPLANE

Original Filed Oct. 21, 1915 3 sheets-sheet 2

Inventor

Charles Arthur Wragg

By Davis & Davis

Attorneys

Mar. 6, 1923. Re. 15,555

C. A. WRAGG

AEROPLANE

Original Filed Oct. 21, 1915 3 sheets-sheet 3

Inventor
Charles Arthur Wragg

By Davis & Davis

Attorneys

Reissued Mar. 6, 1923. Re. 15,555

UNITED STATES PATENT OFFICE.

CHARLES ARTHUR WRAGG, OF MELBOURNE, VICTORIA, AUSTRALIA.

AEROPLANE.

Original No. 1,209,923, dated December 26, 1916, Serial No. 57,062, filed October 21, 1915. Application for reissue filed December 17, 1918. Serial No. 267,969.

*To all whom it may concern:*

Be it known that I, CHARLES ARTHUR WRAGG, subject of the King of Great Britain, residing at 355 Post Office Place, Melbourne, in the State of Victoria, Commonwealth of Australia, have invented new and useful Improvements in Aeroplanes, of which the following is a specification.

This invention relates to certain improvements in aeroplanes and such like flying machines and refers more especially to machines "heavier than air" that is broadly to machines which are sustained by their forward motion though it will be understood that the invention is equally applicable to "lighter than air" machines such as dirigibles having projecting planes or vanes.

In aeroplanes a wide range of flying speeds is regarded as one of the most desirable attributes because of the benefits derived from the ability to rise from or alight within restricted areas without interfering with the higher limit of speed of which the machine is capable. High speed flying has therefore to a large extent resolved itself into a question of landing safely and this point has become more difficult as the maximum speed is increased.

The speed of flight is *inter alia* governed by three factors—(*a*) surface area of the planes (*b*) camber thereof and (*c*) angle of incidence or attack.

The object of this invention is to provide means whereby each of these three factors may be varied and adjusted relative to and in conjunction with each other with a view to modifying the control of the flight speed, and sustentation and thereby a greater variety for range of speeds is obtainable. In one embodiment of my invention I accomplish this object by providing a plurality of two or more main planes (either flat or cambered) arranged in series one behind the other the leading edge of one being in line with the trailing edge of the one in front of it with means whereby the space between any two planes may be adjustably inclosed to provide an increased surface area in conjunction with means whereby the rearward plane may be adjusted in angle of incidence relative to the forward plane so that not only is a modification effected in the angle of incidence but also the camber of the planes taken together as a whole. I may also provide means for modifying and adjusting the angle of incidence or area or both the angle and the area of the tail plane in relation to and in conjunction with the aforesaid modifications of the main plane area and angle of incidence thereof.

This invention will now be more fully described aided by a reference to the accompanying sheets of drawings in which—

Figure 3:
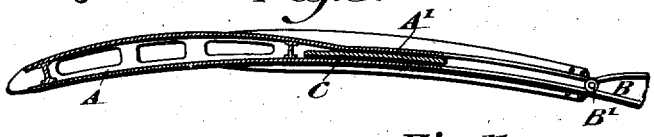
Figure 11:
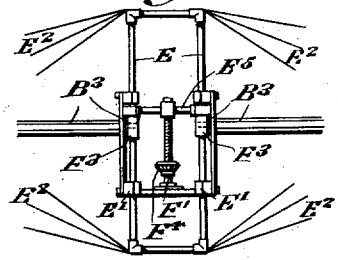
Figure 2:
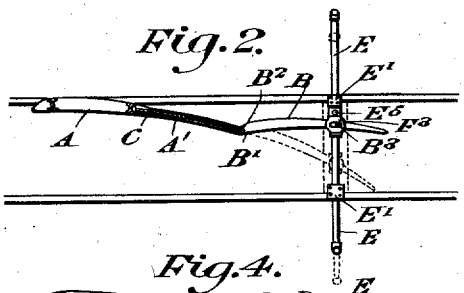
Figure 4:
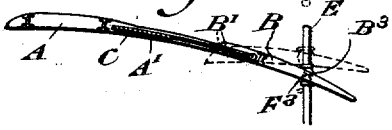
Figure 15:
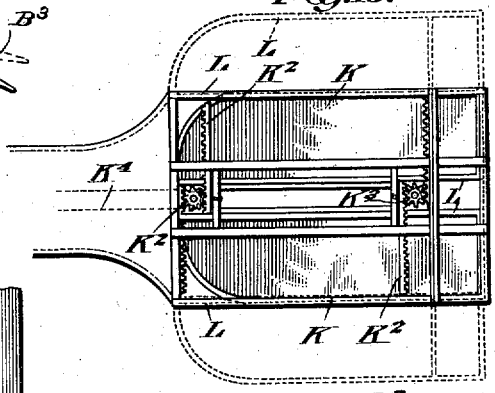
Figure 5:
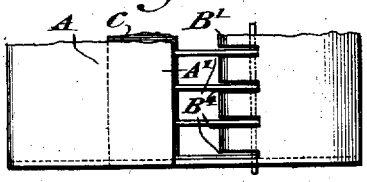
Figure 16:
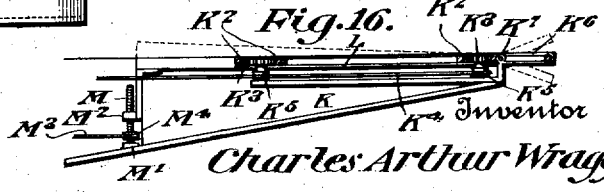
Figure 6:
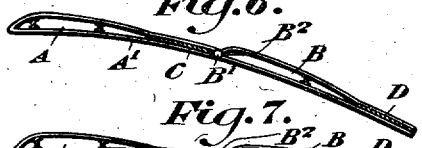
Figure 7:
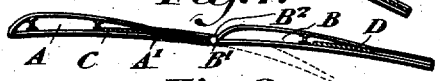
Figure 8:
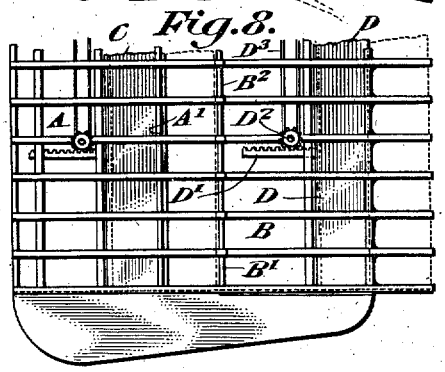
Figure 9:
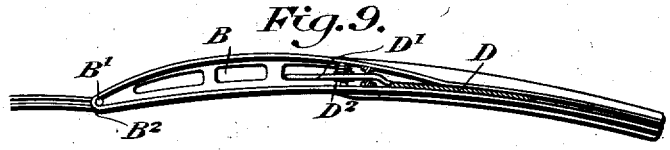
Figure 10:
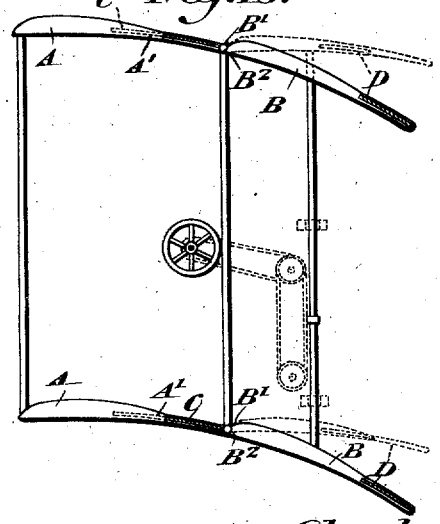
Figure 14:
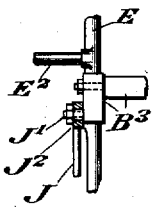
Figure 12:
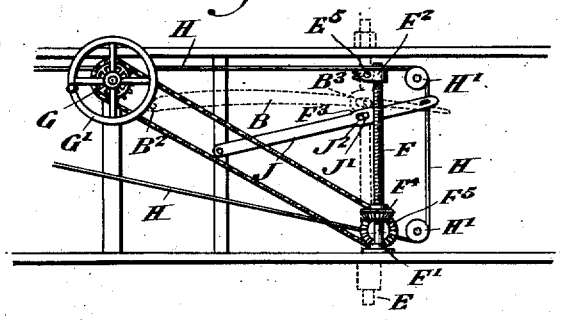
Figure 13:
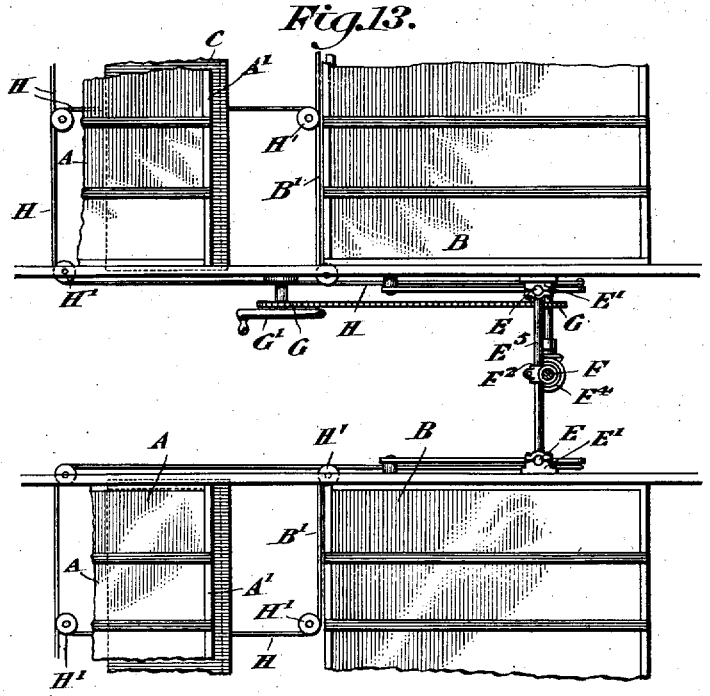

Figure 1 is a side elevation in outline of an aeroplane embodying this invention showing the two main planes in section with the space between inclosed as used for slow speed flying. Fig. 2 is a detail sectional view of the two main planes showing the space between open as used for high speed flying. Fig. 3 is an enlarged cross section of the leading plane showing the mounting of the movable shutter therein. Fig. 4 is a cross section of the two main planes showing a modified tilting arrangement for the rear or trailing plane. Fig. 5 is a plan of the same. Figs. 6, 7, 8 and 9 are detail views of the main planes showing the mounting of an additional shutter in the rear of the trailing plane. Fig. 10 is a diagrammatic side elevation showing the adaptation of the invention to a biplane. Fig. 11 is an end elevation of the cabane showing mechanism devised for adjusting the angle of incidence of the rear or trailing plane. Figs. 12 and 13 are side elevation and plan respectively of mechanism devised for adjusting and controlling both the angle of incidence of the planes and the operation of the shutter adapted to inclose the space between the two main planes. Fig. 14 is a detail view showing the connection between the rear plane and the cabane. Fig. 15 is a plan and Fig. 16 a side elevation of the tail plane showing the means for regulating the area thereof.

In adapting this invention to an aeroplane of the monoplane type as shown in Fig. 1 the main plane is divided into two or more separate planes A and B (or parts of a main plane) with a space between, the leading edge B′ of the rearmost plane B being in a direct line with the trailing edge A′ of the forward plane that is to say in such a position that when the space is inclosed a more or less continuous plane is effected.

Between the upper and lower surfaces of the forward plane A along its trailing edge A′ I provide a sliding plane or shutter C with means whereby the same may be moved back and connected with the leading edge of the rearmost plane B whereby the space between the two planes A and B may be relatively inclosed to any extent as required and the surface area thereby correspondingly increased.

In order to further increase the area of the plane surface I provide a sliding plane or shutter D fitted between the surfaces of the trailing edge of the rear plane B as shown in Figs. 6, 7, 8, 9 and 10. This sliding shutter D may be operated simultaneously with the sliding plane C or if desired this shutter D may be operated independently.

The foremost plane A is rigidly connected to the body of the machine as at present while the rearward plane B is hinged at $B^2$ and adapted to tilt with a view to adjusting its angle of incidence. Any suitable mechanism may be adopted for this purpose; one convenient way is shown in Figs. 2, 11, 12, 13 and 14. For this purpose the said rearward plane B is connected to a vertical adjustable or movable cabane E which comprises a rectangular framework mounted on vertical guides E′ upon the body of the machine the planes being connected by wires $E^2$ (see Figs. 1 and 11) to the said frame E. The framework or cabane E is capable of vertical adjustment (see Figs. 11, 12 and 13) whereby the angle of incidence of the rear plane B is regulated as required. For this purpose a screwed vertical spindle F is mounted at its lower end in a footstep bearing F′ and adapted to pass through a screw threaded nut $F^2$ attached to a transverse bar or rod $E^5$ of the cabane E, while formed on or attached to each vertical side bar of the cabane E is a slotted bracket $F^3$ adapted to receive the end of one of the bars $B^3$ of the rear plane as shown in Figs. 11, 12 and 14. The aforesaid screwed spindle F is furnished with a miter wheel $F^4$ gearing with a miter wheel $F^5$ and adapted to be operated through the medium of sprocket gearing G by the hand wheel G′.

In Fig. 4 the rear plane is shown as balanced, that is to say it is so mounted that it is hinged or capable of tilting upon a line a short distance back from its leading or forward edge B′. The shutter C in this case is adapted to move backward until it registers or meets the line of the forward edge of the rear plane B the supporting webs of the forward or leading plane A being extended back to the tilting or hinge line of the plane B and being accommodated in slots $B^4$ as shown in Fig. 5. When the space between the two planes A and B is inclosed by the aforesaid shutter C it will be seen that the effect of a complete single plane is produced and that by the adjustment of the angle of incidence of the rear or trailing plane B corresponding adjustment is made in the camber of the said complete plane taken as a whole.

In order to operate the sliding shutter C between the planes A and B simultaneously with the operation of adjusting the angle of incidence of the rear plane B wires or the like H passing about suitable pulleys H′ are connected to the front and back edges of the shutter or plane C and these wires H are connected to a pair of hinged arms J which are pivoted to the machine frame and adapted to be operated by the raising and lowering of the cabane E by pins J′ projecting from the vertical bars of the cabane E and passing through a slot $J^2$ formed in the said pivoted arm J as shown in Figs. 11, 12 and 13. Thus it will be understood that at whatever angle of incidence the rear plane B is set, the sliding shutter or plane C is simultaneously moved the required distance in order to increase or decrease the area of the main plane in relation to the angle of incidence or in other words the camber of the complete plane taken as a whole. Similarly the sliding shutter D mounted on the trailing edge of the rear plane B may be operated in any convenient manner and preferably in conjunction with and in relation to the adjustment of the angle of incidence of the said rear plane B. In Fig. 9 this sliding plane D is shown as operated by a rack D′ connected to the shutter D and gearing with the rack pinion $D^2$ which is operated by the wire $D^3$. Furthermore in conjunction with the aforesaid means for adjusting the area and angle of incidence of the main planes, I provide means for modifying the area and the angle of the tail plane K (see Figs. 15 and 16). For this purpose I provide sliding shutters L one upon either side of the tail plane K adapted to move out from the side of the said tail plane K and thereby increase its area as shown by the dotted lines in Fig. 15. Any suitable mechanism may be provided for effecting this movement of the shutters L such as projecting racks $K^2$ secured to the inner edges of the planes K and gearing with rack pinions $K^3$ and operated by the wires $K^4$ passing about the pulleys $K^5$. These sliding shutters L are adapted to be operated simultaneously with the operation of the sliding planes C and D in the main planes A and B.

Means are also provided for adjusting the angle of the tail plane in relation to the area of the same and position of the elevator $K^6$ of the tail plane K in conjunction with the adjusting of the angle of incidence and area of the main plane or planes. For this purpose the trailing portion of the tail plane K is hinged to the hinge bar $K^7$ of the elevator (see Fig. 16) while at the desired position forward at the meeting point of the tail plane K and the body of the machine is a vertical screwed rod M mounted in a foot step bearing M′ and engaging a nut $M^2$ secured to the tail plane. This screwed rod is adapted to be operated in conjunction with the adjustments of the main plane and the movable shutters C and D and L by suitable means such as by a wire $M^3$ passing about a pulley $M^4$ mounted on the rod M.

I claim:—

1. In an aeroplane having two planes arranged one behind the other with a space between, means whereby the space between may be bridged by a substantially rigid member to thereby increase the plane area.

2. In an aeroplane having two planes arranged one behind the other with a space between, means whereby the space between may be bridged completely to thereby provide an increased surface area, means being provided whereby the surface area of said trailing plane may be adjustably increased, and means being further provided whereby the said trailing plane may be adjusted in angle of incidence relative to the forward plane.

3. In aeroplanes two main planes arranged one behind the other the leading edge of one being in line with the trailing edge of the other with a space between, the forward or leading plane having a sliding shutter adapted to inclose the said space and thereby increase the surface area, the rearward or trailing plane being hinged or tilting, with means for adjusting and regulating the angle of incidence thereof in conjunction with the movement of the said shutter, substantially as described.

4. In aeroplanes two main planes arranged one behind the other the leading edge of one being in line with the trailing edge of the other with a space between, the forward or leading plane having a sliding shutter adapted to inclose the said space and thereby increase the surface area, the rearward or trailing plane having a sliding shutter whereby the surface area of the same can be adjustably increased and means for adjusting and regulating the angle of incidence of the trailing plane.

5. In aeroplanes the combination of a forward or leading plane and a rearward or trailing hinged or tilting plane and a sliding shutter between the said planes with mechanism for adjusting the angle of the rear or trailing plane and for operating the sliding shutter, comprising a vertical sliding frame or cabane connected to the trailing plane, a screw rod mounted on the machine frame and adapted to engage a nut on the sliding frame or cabane and furnished with a toothed wheel gearing with a toothed pinion mounted on a driving shaft, hinged arms hinged to the machine frame and connected to the cabane and operating draw wires attached to the shutter, substantially as described.

6. In aeroplanes the combination of a forward or leading plane and a balanced rearward or trailing plane and a sliding shutter between the two planes, with the means for adjusting the angle of the rear or balanced plane in conjunction with and in relation to the movements of the sliding shutter, substantially as described.

7. In an aeroplane having two planes arranged one behind the other with a space between, the combination of means whereby the space between may be adjustably enclosed to provide an increased area, means whereby the trailing plane may be adjusted in angle of incidence relative to the leading plane, and means also for adjusting the area of the tail plane.

8. In aeroplanes the combination with a forward or leading plane and a hinged or tilting rearward or trailing plane with a space between, with means for inclosing the said space to increase the surface area of the two planes, of a tail plane having adjustable side shutters adapted to increase the area of the said tail plane, substantially as described.

9. In an aeroplane, the combination with a forward plane and a rear plane having a space between, means for rigidly and completely bridging the space between the two planes to thereby increase the plane area to the extent of the bridge, and means for adjusting the angle of incidence of the rear plane.

10. In aeroplanes the combination with a forward or leading plane and a hinged or tilting rearward or trailing plane with adjustable shutters adapted to increase the surface area of the said planes, of a tail plane having adjustable shutters adapted to increase the surface area thereof substantially as described.

11. In aeroplanes the combination with a forward or leading plane and a hinged or tilting rearward plane with adjustable shutters adapted to increase the surface area of the said planes, of a tail plane having adjustable shutters adapted to increase the surface area thereof and means for adjusting the angle of incidence of the said tail plane substantially as described.

12. In aeroplanes, the combination of a leading plane A, trailing plane B, with a space between, sliding shutter C adapted to enclose the said space, means for operating the sliding shutter C, means for tilting the said plane B, a sliding shutter D adapted to increase the surface area of the trailing plane B with means for operating the same, and a tail plane K with means for adjusting the angle thereof, sliding shutters L adapted to increase the area of the tail plane K and means for operating the same, substantially as described.

13. In a flying machine, a plane consisting of a forward section and a rear section separated therefrom by a space, and an additional plane member operable to bridge said space to thereby increase the rigid plane area of the machine.

14. In a flying machine, a plane structure embodying two sections arranged one behind the other and spaced apart, a manually controlled rigid plane member adapted to bridge the space between the two sections to thereby increase the plane area, and means whereby the rear section may be bodily tilted on an axis transverse to the line of flight, for the purposes set forth.

In testimony whereof I hereunto affix my signature.

CHARLES ARTHUR WRAGG.